United States Patent
Fujishita

(10) Patent No.: US 8,379,276 B2
(45) Date of Patent: Feb. 19, 2013

(54) IMAGE READING APPARATUS AND IMAGE READING METHOD

(75) Inventor: Masahiro Fujishita, Nagoya (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1040 days.

(21) Appl. No.: 12/315,725

(22) Filed: Dec. 5, 2008

(65) Prior Publication Data

US 2009/0161175 A1    Jun. 25, 2009

(30) Foreign Application Priority Data

Dec. 19, 2007  (JP) .................................. 2007-327328

(51) Int. Cl.
*H04N 1/04* (2006.01)
*H04N 1/387* (2006.01)

(52) U.S. Cl. ........ 358/486; 358/488; 358/497; 358/474; 358/444; 358/453

(58) Field of Classification Search ........................ None
See application file for complete search history.

(56) References Cited

U.S. PATENT DOCUMENTS

| 6,937,369 B2 * | 8/2005 | Shih et al. .................... 358/486 |
| 2007/0165285 A1 | 7/2007 | Inada |

FOREIGN PATENT DOCUMENTS

| JP | 6-217090 | 8/1994 |
| JP | 8-274972 | 10/1996 |
| JP | 08274948 A * | 10/1996 |
| JP | H8-274948 | 10/1996 |
| JP | 2005-184360 | 7/2005 |
| JP | 2006-87027 | 3/2006 |
| JP | 2007-194753 | 8/2007 |

OTHER PUBLICATIONS

Official Action dated Jun. 7, 2011 from the Japanese Patent Office from related Japanese Application No. 2007-327328, together with a partial English-language translation.

* cited by examiner

*Primary Examiner* — Cheukfan Lee
(74) *Attorney, Agent, or Firm* — Scully, Scott, Murphy & Presser, P.C.

(57) ABSTRACT

A method for controlling an image reading apparatus that scans an image from a document, includes (a) acquiring read position data indicating a reference position where the image reading apparatus performs scanning operations, and (b) setting a reading region that defines, based on the acquired read position data, a range that is used when the image reading apparatus scans an image.

17 Claims, 10 Drawing Sheets

IMAGE READING APPARATUS AND IMAGE READING METHOD

CROSS REFERENCE TO RELATED APPLICATION

This application claims priority from Japanese Patent Application No. 2007-327328 filed Dec. 19, 2007. The entire content of the priority application is incorporated herein by reference.

TECHNICAL FIELD

The invention relates to a read control program to install and execute in a computer configured to control image reading apparatuses, an installation program for installing such a read control program into a computer, and an image reading apparatus.

BACKGROUND

There have been known flatbed type image reading apparatuses having a document table and configured to read a document placed on the document table. For example, Japanese Patent Application Publication No. 08-274972 discloses a flatbed type image reading apparatus that reads a document with its corner aligned at the corner of the document table.

SUMMARY

In addition to the type of the image reading apparatus (hereinafter this reading system is referred to as "corner-alignment type") in which the document is read with its corner aligned at the corner of the document table as disclosed in Japanese Patent Application Publication No. 08-274972, there are several types of flatbed type image reading apparatuses. For example, there have been know one type of an image reading apparatus which reads an image from a document aligned with a part of the document table other than the corners thereof (hereinafter, this reading system will be referred to as "center-alignment type.").

The image reading apparatuses are controlled by read control programs. Various read control programs needs to be developed for each of the corner-alignment type and the center-alignment type. Inevitably, steps of developing and designing read control programs become numerous.

In view of the foregoing, it is an object of the invention to provide a read control program that can easily be applied to different reading systems.

In order to attain the above and other objects, the invention provides a method for controlling an image reading apparatus that scans an image from a document. The method includes (a) acquiring read position data indicating a reference position where the image reading apparatus performs scanning operations, and (b) setting a reading region that defines, based on the acquired read position data, a range that is used when the image reading apparatus scans an image.

According to another aspects, the invention provides a method for installing on a computer that comprises a storing unit, a read operation program that controls an image reading apparatus that scans an image of a document. The method includes (A) acquiring read position data indicating a reference position where the image reading apparatus performs scanning operations, and (B) writing the acquired read position data into an area of the storing unit.

According to still another aspects, the invention provides an image reading apparatus. The image reading apparatus includes a scanning unit, a storing unit, a reading unit, and a setting unit. The scanning unit is configured to perform scanning operation. The storing unit is configured to store read position data indicating a reference position where the image reading apparatus performs scanning. The reading unit is configured to read the read position data stored in the storing unit. The setting unit is configured to set a reading region that defines, based on the read position data, a range that is used when the image reading unit reads the image.

According to still another aspects, the invention provides a computer-readable storage medium storing a set of program instructions installed on and executed by a computer for controlling an image reading apparatus that scans an image from a document. The program instructions includes (a) acquiring read position data indicating a reference position where the image reading apparatus performs scanning operations, and (b) setting a reading region that defines, based on the acquired read position data, a range that is used when the image reading apparatus reads an image.

According to still another aspects, the invention provides a computer-readable storage medium storing a set of program instructions executed by a computer having a storing unit for installing a read operation program of an image reading apparatus. The program instructions includes (A) acquiring read position data indicating a reference position for scanning operation where the image reading apparatus performs scanning operations, and (B) writing the acquired read position data into an area of the storing unit.

BRIEF DESCRIPTION OF THE DRAWINGS

Embodiments in accordance with the invention will be described in detail with reference to the following figures wherein.

DETAILED DESCRIPTION

Next, an embodiment of the invention will be described while referring to the accompanying drawings.

First Embodiment

[Outline of the Image Reading System]

Figure 1:
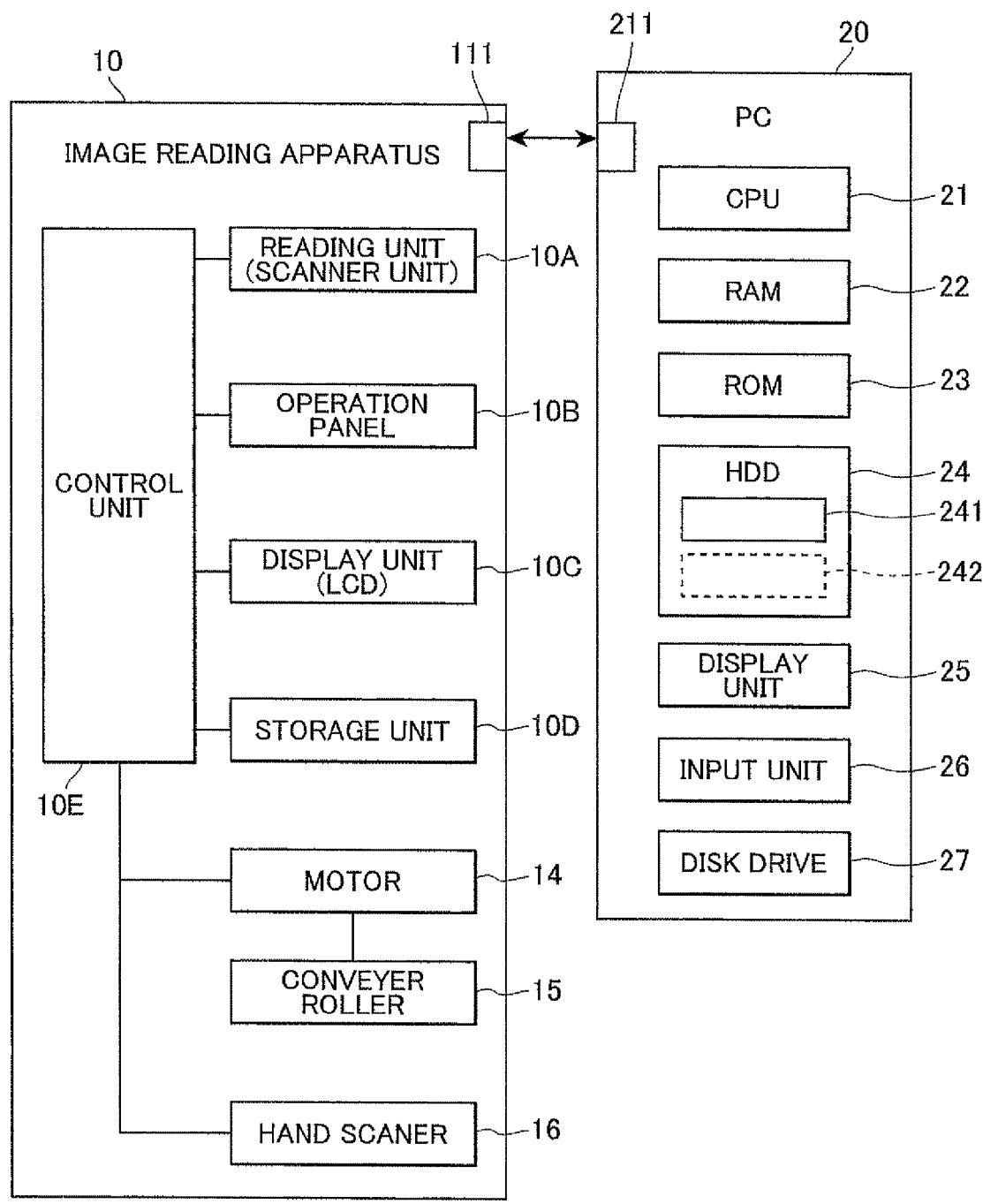
FIG. 1 is a block diagram outlining an image reading system that includes an image reading apparatus and a computer according to embodiments.

As shown in FIG. 1, an image reading system 1 includes the image reading apparatus 10 and a computer 20.

As shown in FIG. 1, the computer 20 includes a CPU 21, a RAM 22, a ROM 23, a magnetic storage device (HDD) 24, a display unit 25 such as an LCD, an input unit 26 such as a keyboard and a mouse, a disk drive 27, and a connection port 211. The HDD 24 includes a position data storage area 241. The position data storage area 241 is a storage area allocated to registry in the computer 20 that uses Windows (registered trademark) as an operating system (OS). The position data storage area 241 is for storing read position data. The disk drive 27 is configured to read data stored in data media such as a CD-ROM and an FD. The connection port 211 is connected to the connection port 111.

A read control program is stored (installed), in advance, in the HDD 24 by performing installation procedures included in an install program. Whenever necessary, the read control program is read into the RAM 22 and executed by the CPU 21. On the other hand, the installation program is stored in a data medium such as a CD-ROM. The installation program is read from the data medium into the RAM 22 through the disk drive 27 and executed by the CPU 21.

Figure 10C:
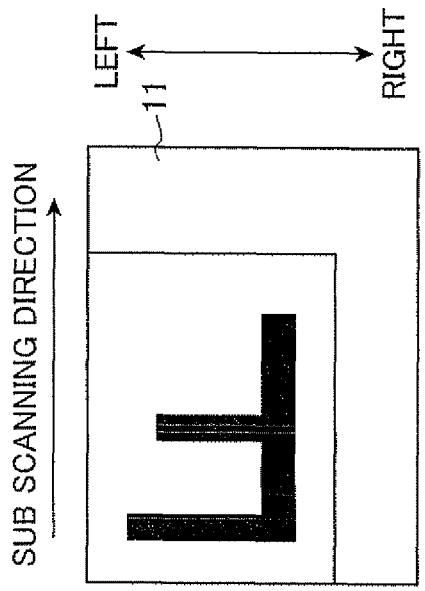
FIG. 10(c) is a diagram showing a document located on the FB document table in a left corner-alignment basis when the document is read in the FB reading mode.
Figure 10D:
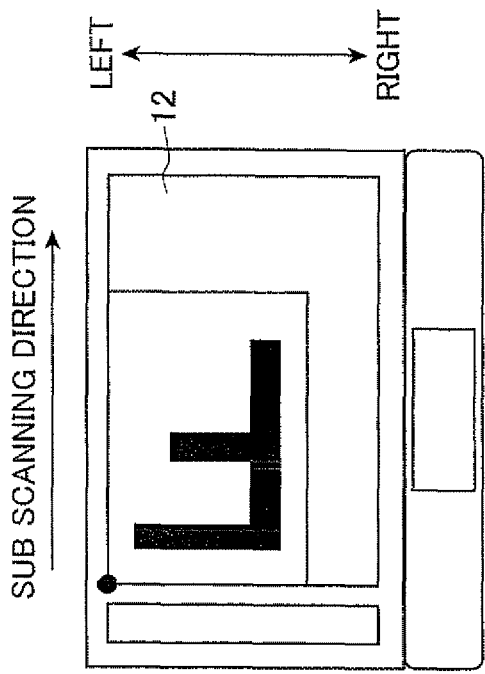
FIG. 10(d) is a diagram showing a document located on the ADF reading table in a left corner-alignment basis when the document is read in the ADF reading mode.
Figure 10A:
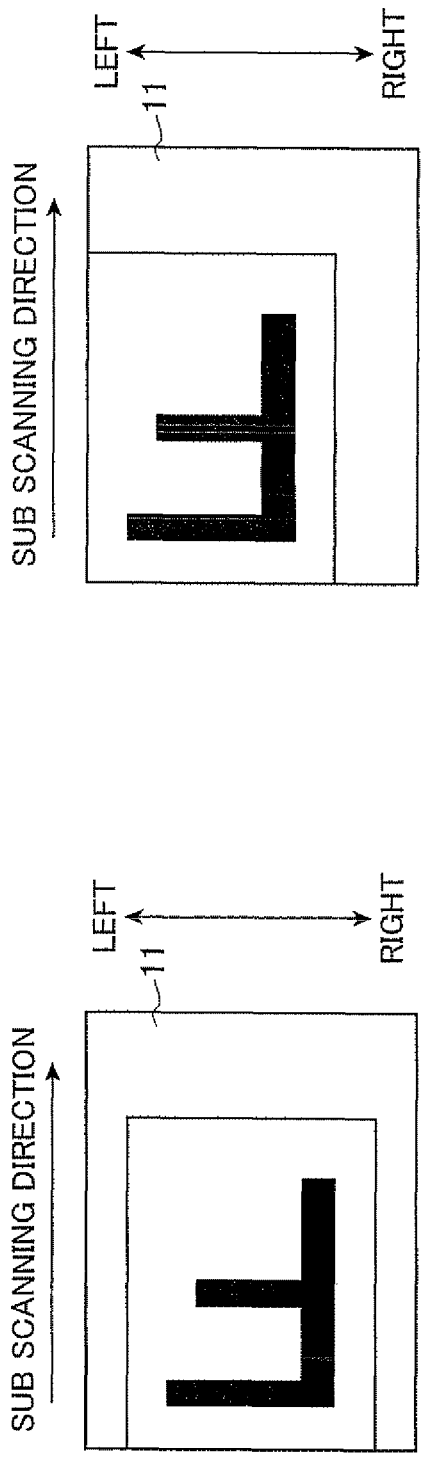
FIG. 10(a) is a diagram showing a document located on a FB document table in a center-alignment basis when the document is read in an FB reading mode.
Figure 10B:
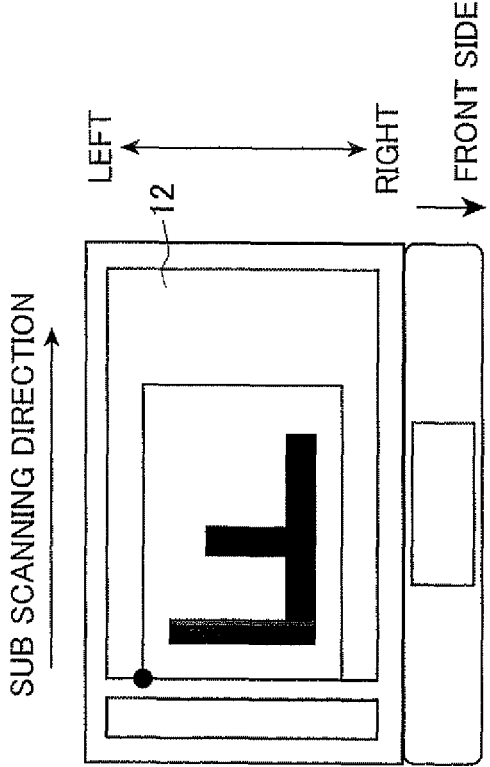
FIG. 10(b) is a diagram showing a document located on an ADF document table in a center-alignment basis when the document is read in an ADF reading mode.

The image reading apparatus 10 includes a reading unit (scanner unit) 10A, an operation panel 10B, a display unit 10C, a storage unit 10D, a control unit 10E, a connection port 111, a motor 14, a conveyer roller 15, a hand scanner 16. The reading unit 10A reads images. The reading unit 10A can move in a sub scanning direction (see FIG. 10(a)). The operation panel 10B is operated and set by the user. The display unit 10C displays various data items. The storage unit 10D stores data. The control unit 10E controls the reading unit 10A. The control unit 10E controls the motor 14. A rotational force generated by the motor 14 rotates the conveyer roller 15 via gear mechanisms (not shown).

The control unit 10E is a known microcomputer configured with a CPU, a ROM and a RAM.

Figure 2:
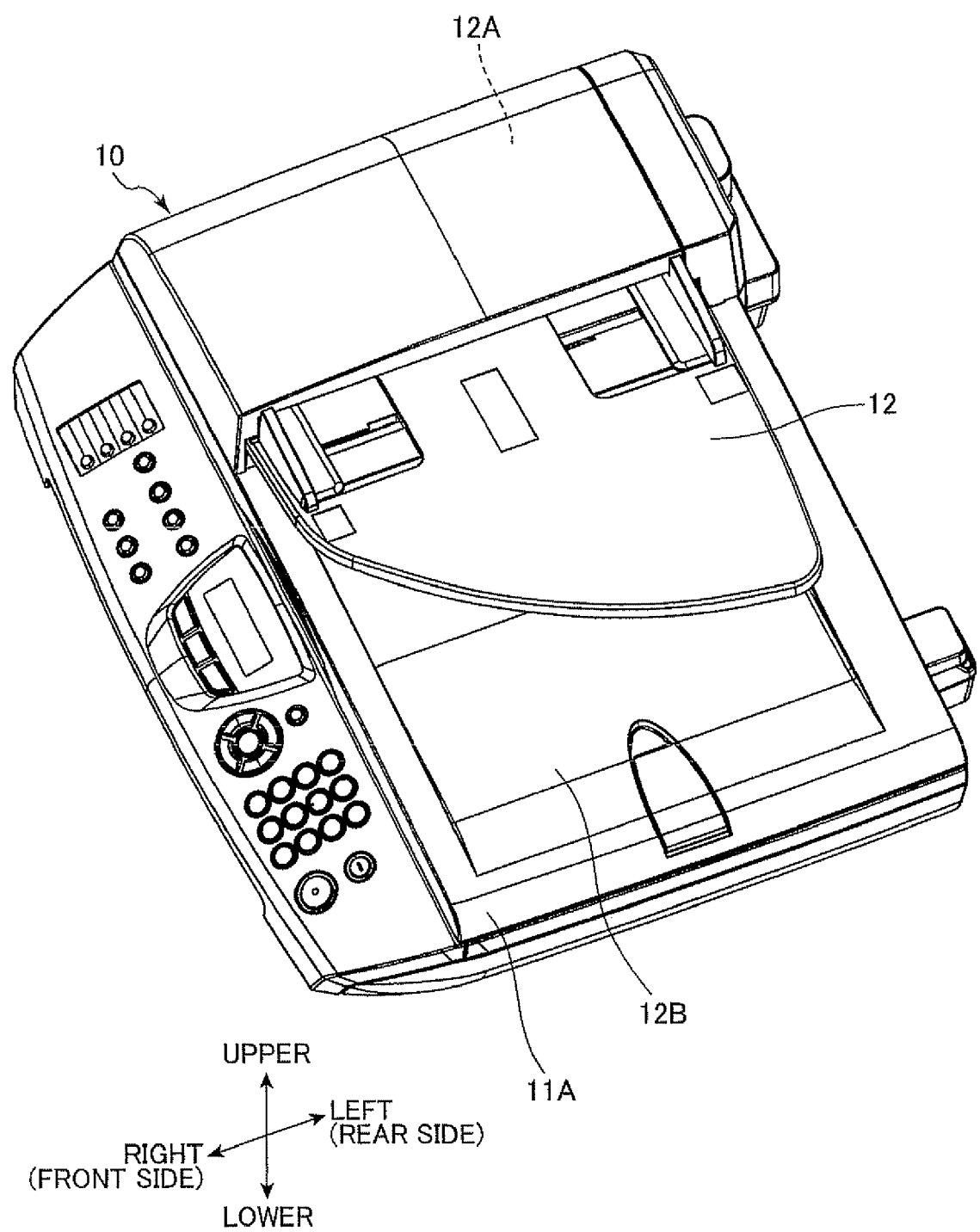
FIG. 2 is a perspective top view of the image reading apparatus.
Figure 3:
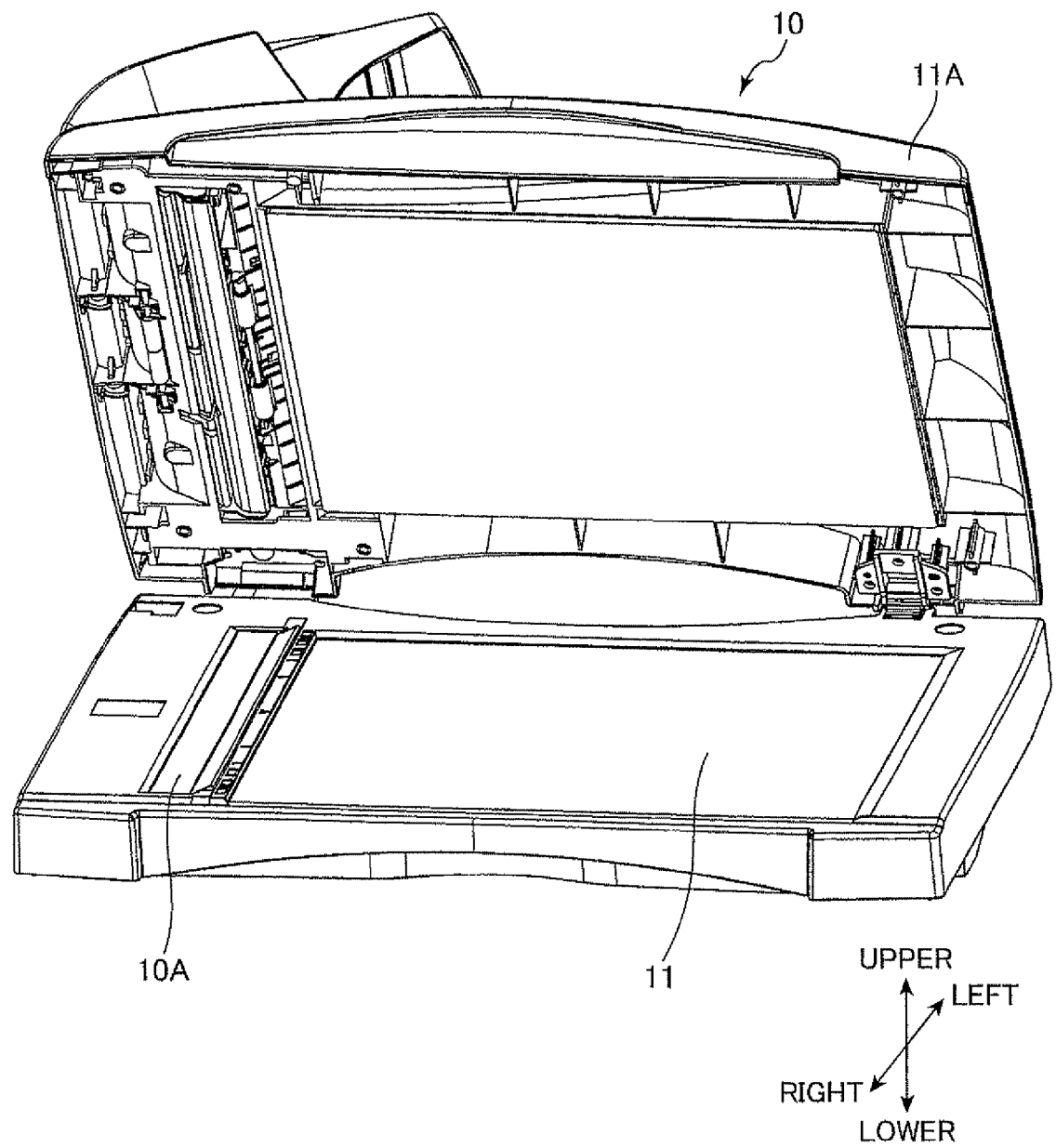
FIG. 3 is a perspective top view of the image reading apparatus when a document cover is opened.

As shown in FIGS. 2 and 3, the image reading apparatus 10A includes an FB document table 11 and an automatic document feeder (ADF) document table 12. The FB document table 11 and the ADF document table 12 extend in a left-to-right direction and a sub scanning direction that is orthogonal to the left-to-right direction (see FIGS. 10(a)-10(d)). The image reading apparatus 10 performs reading operation in a flatbed (FB) reading mode and an ADF reading mode. In the FB reading mode, the image reading apparatus 10 reads a document located at rest on the FB document table 11 in a state as shown in FIG. 3. In the FB reading mode, the reading unit 10A moves in the sub scanning direction to read the image of the document. In the ADF reading mode, the image reading apparatus 10 reads a document being automatically fed by the conveyer roller 15 to the reading unit 10A from the ADF document table 12 in a state as shown in FIG. 2. Here, in the ADF reading mode, reading unit 10A does not move in the sub scanning direction.

The FB document table 11 is an image-reading window that is a glass plate or an acrylic plate. On a frame of the FB document table 11, a document cover 11A is swingably provided as shown in FIG. 3, covering the FB document table 11.

As shown in FIG. 2, an ADF mechanism 12A and an ejection tray 12B are provided on the upper surface of the document cover 11A. The ADF mechanism 12A automatically feeds documents located on the ADF document table 12 to the reading unit 10A. The ejection tray 12B is provided to hold a document that has been read.

A document sensor (not shown) is provided at the ADF document table 12 (more precisely, at the document inlet port of the ADF mechanism 12A). The document sensor detects whether or not a document is located on the ADF document table 12. When the document sensor generates a signal indicating that a document exists on the ADF document table 12, the read control program according to the first embodiment drives the image reading apparatus 10 in the ADF reading mode.

[Installation of the Read Control Program]

The read control program that controls the image reading apparatus 10 is installed by activating the installation program stored in the data medium such as a CD-ROM through the disk drive 27, as described above.

<Installation>

Figure 4:
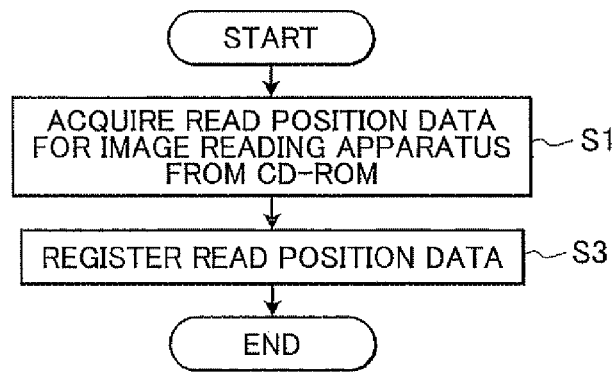
FIG. 4 is a flowchart schematically illustrating an operation of an installation program that installs a read control program (scanner driver) into the computer.

When the installation program, (installer) is activated, as shown in FIG. 4, in S1 the CPU 21 acquires the read position data for the image reading apparatus 10 from the data medium (CD-ROM) that holds the installation program. For example, the CPU 21 acquires the read position data for the FB reading mode or the read position data for the ADF reading mode.

Next, the read control program is installed into the computer 20 (more precisely, into HDD 24). In S3 the CPU 21 registers the read position data acquired in Step S1 by writing the read position data in the position data storage area 241 where the read control program can be read. Subsequently, the CPU 21 ends the installation of the read control program.

The read position data is data from which the image reading apparatus determines a region to be read by the image reading apparatus 10. The read position data for the FB reading mode indicates location information of a document relative to the FB document table 11. The read position data for the ADF reading mode indicates location information of a document relative to the ADF document table 12.

More specifically, in the present embodiment, in the FB reading mode, the read position data can take one of a (left/right) corner-alignment and a center-alignment. The read position data "(left/right) corner-alignment" for the FB reading mode indicates a (left/right) corner-alignment basis method (see FIG. 10(c)) in which data is read from a document with a (left/right) corner of the document aligned at the (left/right) corner of the FB document table 11. The read position date "center-alignment" for the FB reading mode indicates a center-alignment reading basis method (see FIG. 10(a)) in which data is read from a document with a corner of the document aligned with a part of the FB document table 11 other than a corner thereof. In the center-alignment for the FB reading mode, a center of the document corresponds to the center of the FB document table 11 with respect to the left-to-right direction. Further, in the ADF reading mode, the read position data can take one of a (left/right) corner-alignment and a center-alignment. The read position data "(left/right) corner-alignment" for the ADF reading mode indicates a (left/right) corner-alignment basis method (see FIG. 10(d)) in which data is read from a document with a (left/right) corner of the document aligned at the (left/right) corner of the ADF document table 12. The read position data "center-alignment" for the ADF reading mode indicates a center-alignment basis method (see FIG. 10(b)) in which data is read from a document that is aligned with a part of the ADF document table 12 other than the corner thereof. In the center-alignment for the ADF reading mode, a center of the document corresponds to the center of the ADF document table 12 with respect to the left-to-right direction.

Whether the data should be read in the (left/right) corner-alignment basis method or the center-alignment basis method is predetermined in accordance with the model of the image reading apparatus 10. In the first embodiment, the installation program corresponding to the image reading apparatus 10 is supplied to the user of the image reading apparatus 10. Hence, the data medium that stores the installation program also stores the read position data corresponding to the image reading apparatus 10.

The installation program according to the first embodiment writes the read position data stored in the data medium, into the position data storage area 241 without changing the read position data.

<Setting After Installation>

After the read control program has been installed into the computer 20, the value of the read position data that is acquired by the installation program becomes a default value of the read position data. The read control program according to the first embodiment can change the read position data after the program has been installed.

Figure 5:
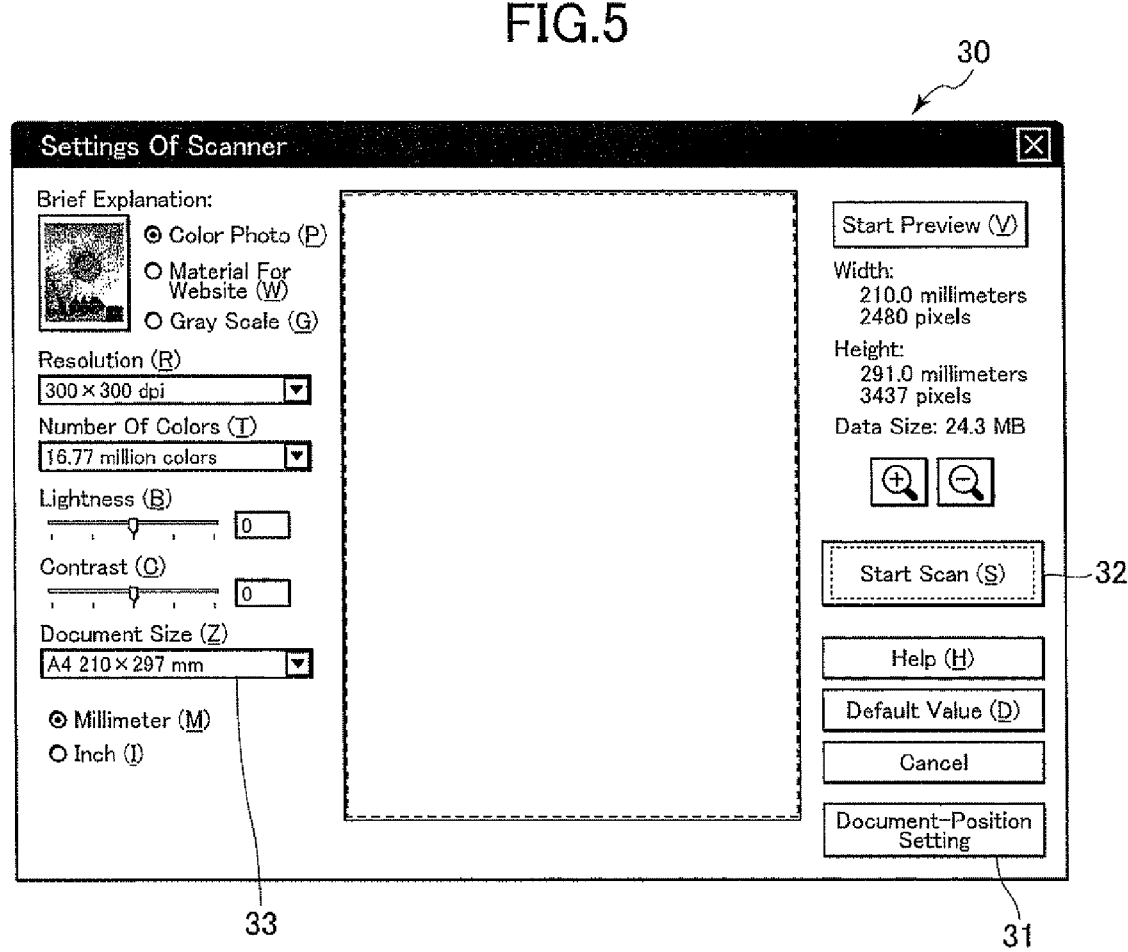
FIG. 5 is a diagram showing an example of a setting screen displayed on a display unit of the computer when the read control program is started.
Figure 6:
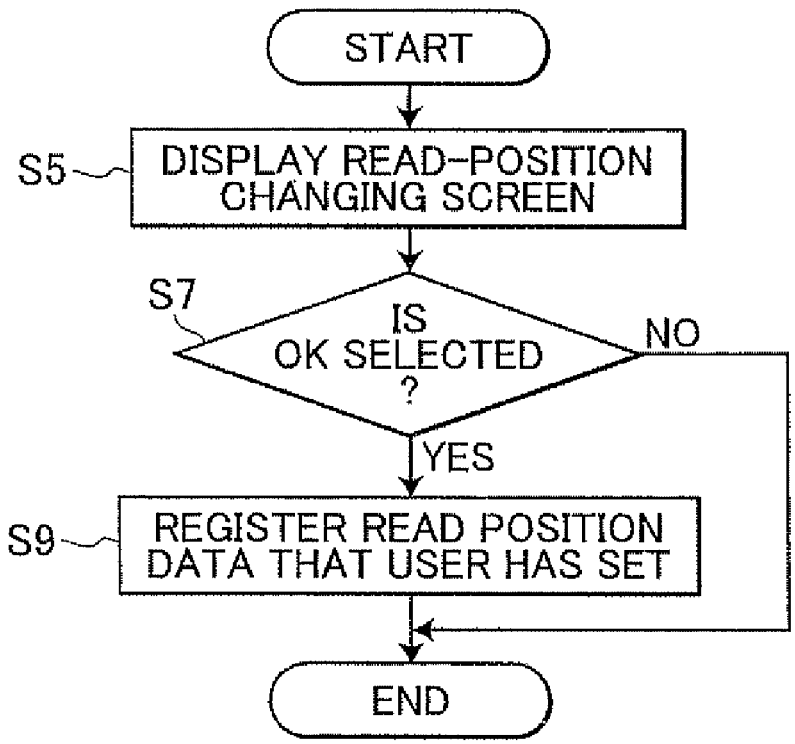
FIG. 6 is a flowchart explaining how read position data is set in response to a user's instruction.

When the read control program is activated, the display unit 25 displays a setting screen 30 of the image reading apparatus as shown in FIG. 5. Using this setting screen 30, the user can designate desirable reading conditions, such as reading resolution. In the first embodiment, the setting screen 30 has a document-position setting button 31, a scan start button 32, and an entry field of a document-sheet size 33. The user may select the document-position setting button 31 to start the process of setting a read-position, which will be explained with reference to FIG. 6.

Figure 7:
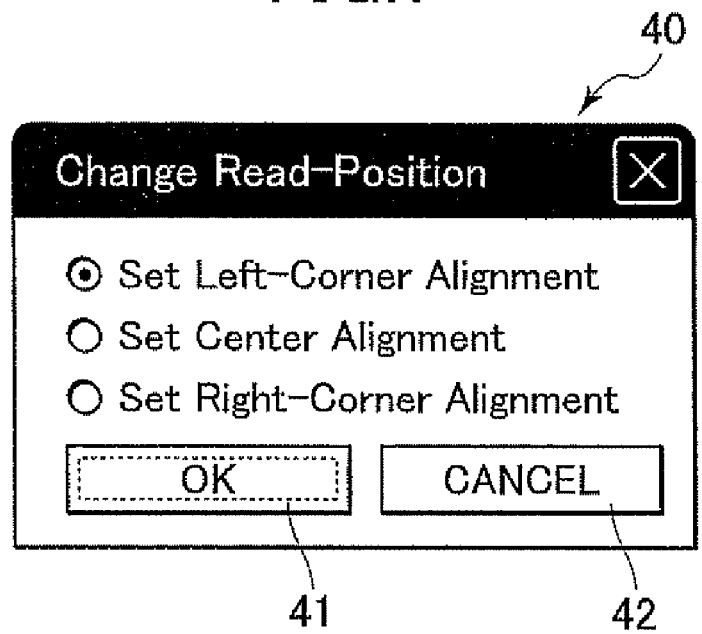
FIG. 7 is a diagram showing a setting screen displayed on the display unit when the read control program is started as shown in FIG. 6.

When the process of setting a read-position is started, in S5 the CPU 21 controls the display unit 25 to display a read-position changing screen 40. In S7 the CPU 21 determines whether an OK button 41 (see FIG. 7) on the read-position changing screen 40 has been selected (depressed).

The read-position changing screen 40 is an input screen to prompt the user to input information that selects one of the corner-alignment basis methods and center-alignment basis method for reading operation In the first embodiment, the user can select one of three methods, i.e., the left corner-alignment basis method, the right corner-alignment basis method, and the center-alignment basis method.

If the CPU 21 determines that the OK button 41 is selected (YES: in S7), in S9 the CPU 21 registers the read position data that the user has set on the read-position changing screen 40 by writing the read position data into the position data storage area 241. Subsequently, the CPU 21 ends the process of setting a read-position.

In the first embodiment, when the process of setting a read-position is started with the document sensor generating a signal indicating the existence of a document, the read position data that the user has set through S5-S7 is registered as new read position data for the ADF reading mode. When the process is started with the document sensor generating a signal indicating the absence of documents, the read position data that the user has set through S5-S7 is registered as new read position data for the FB reading mode.

No matter whether the document has been set or not, the read-position changing screen may be prepared for both the FB reading mode and the ADF reading mode. In this case, the read-position changing screen may be activated at any time the user likes, so that the user may change the read position.

If the CPU 21 determines that the OK button 41 has not been selected (depressed) (S7: No), that is, the CPU 21 determines that a cancel button 42 (see FIG. 7) is selected (depressed), the CPU 21 ends the process of setting a read-position without registering new read position data.

[Outline of Read Control Program]

When the read control program is activated, the display unit 25 displays the setting screen 30, as described above. The user selects the scan start button 32 (see FIG. 5) on the setting screen 30. Then, the CPU 21 performs the process shown in FIG. 8.

Figure 8:
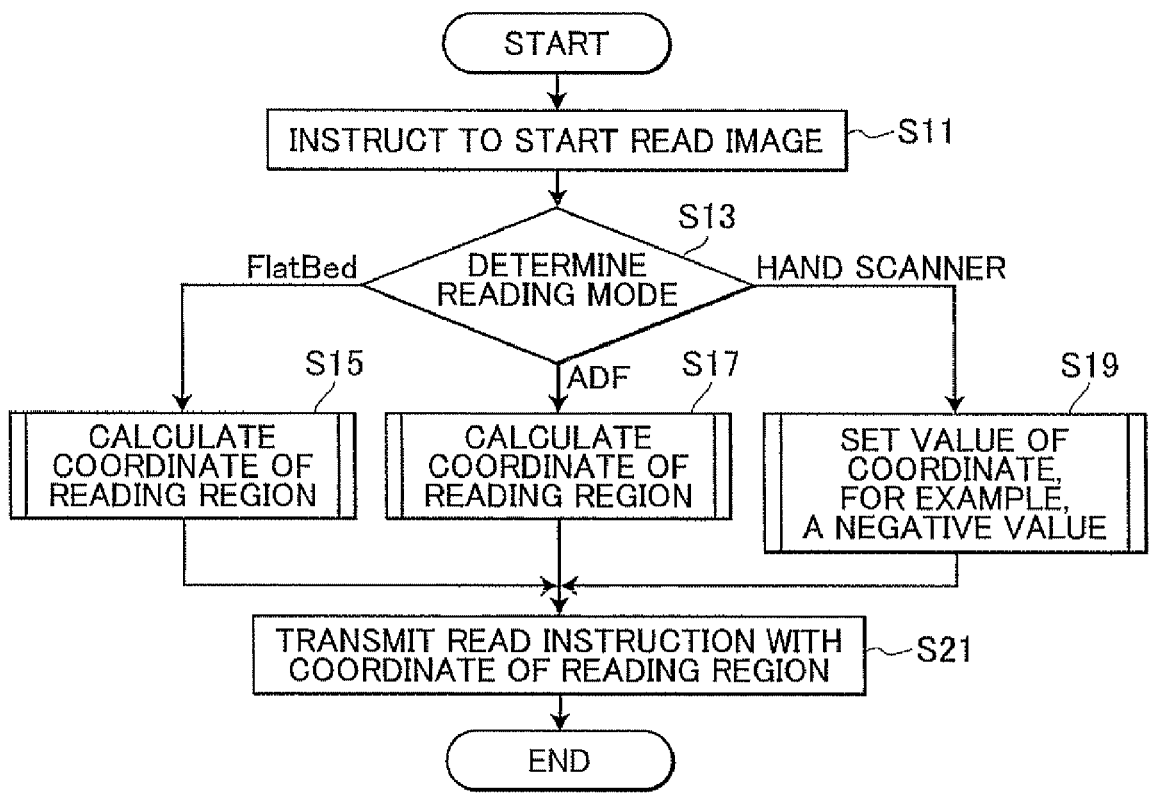
FIG. 8 is a flowchart explaining how the read control program works.

FIG. 8 is a flowchart explaining how the read control program works. When the user selects the scan start button 32, in S11 the CPU 21 sends, toward the image reading apparatus 10, data representing to start reading data. In response to this data, the image reading apparatus 10 transmits, to the computer 20, reading-mode data indicating one of reading modes from among the FB reading mode, the ADF reading mode, and the a hand-scanner reading mode. Here, in the hand-scanner reading mode, the user can read an image of a document by using a hand scanner 16. Based on the reading-mode data, in S13 the CPU 21 determines the reading mode specified by the reading-mode data from among the FB reading mode, the ADF reading mode, and the hand-scanner reading mode.

From the signal coming from the document sensor, the image reading apparatus 10 determines whether the reading mode is the FB reading mode or the ADF reading mode, as described above. The image reading apparatus 10 then transmits the data representing the reading mode to the computer 20.

When the hand scanner 16 is not used, for example, a sensor detects the hand scanner 16 located on a hand scanner location position of the image reading apparatus. From the result of this detection, the image reading apparatus can determine whether or not the image reading apparatus 10 can be set to the hand-scanner reading mode.

If the CPU 21 determines one of the FB reading mode and the ADF reading mode (S13: FB or ADF reading mode), in S15 (Fe reading mode) or S17 (ADF reading mode) the CPU 21 calculates, based on the read position data, coordinates of a reading region that is used when the image reading apparatus reads the document. In other words, the reading region determines a region in which the document is read and in which the image data of the document is acquired. In S21 the CPU 21 transmits a read instruction, toward the image reading apparatus 10, to perform a reading operation by using the calculated coordinates of the reading region.

In the CPU 21 determines the hand-scanner reading mode (S13: hand-scanner), in S19 the CPU 21 sets a value of coordinate to a value by which the reading unit 10A can read an image in neither the FB reading mode nor the ADF reading mode. Thus, in S21 the CPU 21 transmits an instruction, toward the image reading apparatus 10 (more specifically, hand scanner 16), to perform a reading operation by using coordinates of the reading region by which the image reading apparatus 10 can actually perform a reading operation in neither the FB reading mode nor the ADF reading mode.

Here, the coordinates of the reading region by which the image reading apparatus 10 can perform a reading operation in neither the FB reading mode nor the ADF reading mode includes, for example, a negative value or a value irrelevant to the coordinate such as "HANDSCAN".

In the first embodiment, the read position data is thus acquired and registered when the read control program is installed into the computer 20. Accordingly, in the subsequent reading operation, the reading region is determined based on the read position data acquired when the read control program is installed into the computer 20.

Figure 9:
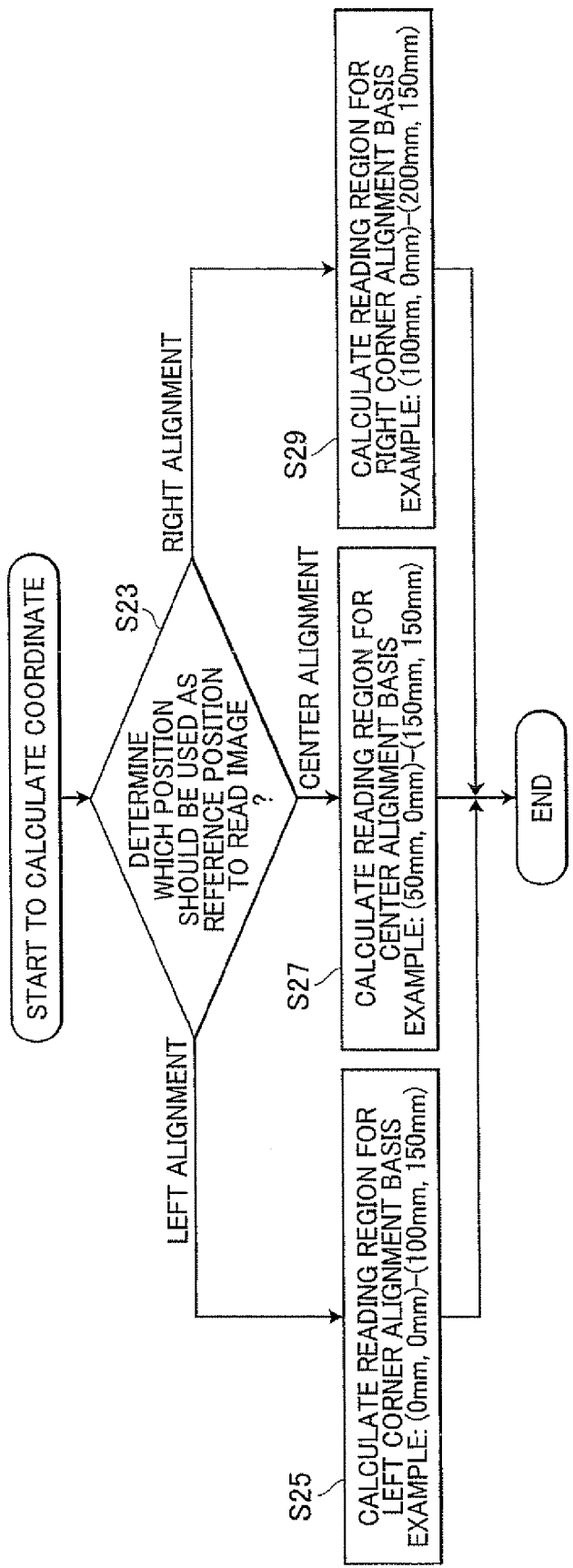
FIG. 9 is a flowchart illustrating calculation processes of read position data.

FIG. 9 is a flowchart that explains the process (S15) of calculating the coordinates, which is performed if the reading mode is found to be the FB reading mode. When this process is started, in S23 the CPU 21 determines which position should be used as a reference position to read data, based on the read position data (left-alignment, right-alignment, or center-alignment) for the FB reading mode that has already been stored in the HDD 24.

Numerical values shown at steps S25, S27, and S29 in FIG. 9 show coordinates when document sheets sized at 100 mm (with respect to the left-to-right direction)×150 mm (with respect to the sub scanning direction). As shown in FIG. 5, the document-sheet size 33 is one of the items that should be designated on the setting screen 30. The document-sheet size 33 is a value that should be input by the user or should be determined based on a default value.

If the left-corner is determined to be the reference position (S23: left corner, that is, an image is read with the left corner-alignment basis method in which a left corner of a document aligned at the left corner of the FB document table), in S25 the CPU 21 calculates the reading region, for example, (0 mm, 0 mm)-(100 mm, 150 mm), by setting the left corner of the FB document table 11 as a reference position. The reading region includes coordinates of two points ((0 mm, 0 mm) and (100 mm, 150 mm)) that corresponds a rectangle region on the FB document table 11. That is, a line connecting the two points corresponds to a diagonal line of the rectangle region. In the present embodiment, for the FB reading mode, a point of origin is set to a left corner of the FB document table 11 that is located upstream end with respect to the sub scanning direction. A coordinate of the FB document table 11 is defined by a length from the point of origin with respect to the left-to-right direction and the sub scanning direction. In other words, in the FB reading mode, the reading region indicates a region of the document table 11 in which an image is read by the reading unit 10A. In other words, the reading unit 10A acquires image data within the rectangle region with respect to the left-to-right direction. Further, the reading unit 10A moves and acquires image data within the rectangle region with respect to the sub scanning direction In the present embodiment, a length of the FB document table with respect to the left-to-right direction is 200 mm.

If the right-corner is determined to be the reference position (S23: right corner, that is an image is read with the right corner-alignment basis method in which a corner of a document aligned at the right corner of the FB document table), in S29 the CPU 21 calculates the reading region, for example, (100 mm, 0 mm)-(200 mm, 150 mm), by setting the right corner of the FB document table 11 as the reference position.

If the center part is determined to be the reference position (S23: center part, that is an image is read with the center-alignment basis method in which a corner of a document aligned at the part of the FB document table other than the corners thereof), in S27 the CPU 21 calculates the reading region, for example, (50 mm, 0 mm)-(150 mm, 150 mm), by setting the center of the FB document table 11 as a reference.

That is, the reading region is set such that the center of the document corresponds to the center of the FB document table 11 with respect to the left-to-right direction.

In S17 the reading region in the ADF reading mode is calculated in the same way with the reading region in the FB reading mode. That is, the reading region includes coordinates of two points, for example, (0 mm, 0 mm)-(100 mm, 150 mm). In the present embodiment, for the ADF reading mode, a point of origin is set to a left corner of the ADF document table 12 that is located upstream end with respect to the sub scanning direction. A coordinate of the ADF document table 12 is defined by a length from the point of origin with respect to the left-to-right direction and the sub scanning direction. The reading region indicates a rectangle region extending in the left-to-right direction and the sub scanning direction. That is, a line connecting the two points corresponds to a diagonal line of the rectangle region. Corner positions of the rectangle region with respect to the left-to-right direction define a range within which the reading unit 10A acquires image data. Corner positions of rectangle region with respect to the sub scanning direction define a length in which the conveyer roller 15 conveys a document such that the document is read by the reading unit 10A. More specifically, in the ADF reading mode, the reading unit 10A does not move in the sub scanning direction. The reading unit 10A reads the image of the document conveyed by the conveyer roller 15 from the ADF document table 12. The storage unit 10D stores a moving length of the document when the conveyer roller 15 rotates prescribed revolutions, for example, one revolution. The controller 15 calculates a numbers of revolution in which the conveyer roller 15 rotates in order to convey the document by a length corresponding to the length of the rectangle region with respect to the sub scanning direction. The reading unit 10A reads the image of the document while the control unit 10E controls the motor 14 such that the conveyer roller 15 rotates the calculated numbers of revolution then conveys the document.

<Features of Image Reading System and Read Control Program>

In the first embodiment, the read control program contains no read position data. The read position data is acquired from the data medium such as a CD-ROM and is stored (registered) in the position data storage area 241 when the read control program is installed into the computer 20. Based on the read position data stored in the position data storage area 241, the CPU 21 determines the reading region which specifies the region to be read by the image reading apparatus 20. Accordingly, the image reading apparatus 10 can easily handle different reading modes (FB reading mode, ADF reading mode, or hand-scanner reading mode).

The CPU 21 determines the reading region which specifies a region of the document to be read by the image reading apparatus 10 after acquiring the read position data. That is, the read position data that indicates a reference position for the scanning operation is not a fixed value but is used as a variable. Accordingly, the read control program can be configured to assign the acquired value with the variable.

In other words, one read control program can work, regardless of the reading mode that the user has selected. As a result, the read control program can easily handle different reading modes.

In the first embodiment, the read position data can be changed in accordance with the user's instruction. The reading region can be set according to the user's intension. This improves the usability of the image reading apparatus 10.

Second Embodiment

In the first embodiment, the installation program is stored in the data medium (i.e., CD-ROM), and the read position data is acquired from the data medium (CD-ROM) and registered in the computer 20. In a second embodiment, the computer 20 transmits, to the image reading apparatus 10, a request for the read position data when the read control program is installed on the computer 20. In response to the request, the image reading apparatus 10 transmits the read position data to the computer 20. The read position data is acquired and registered in the computer 20.

Figure 11:
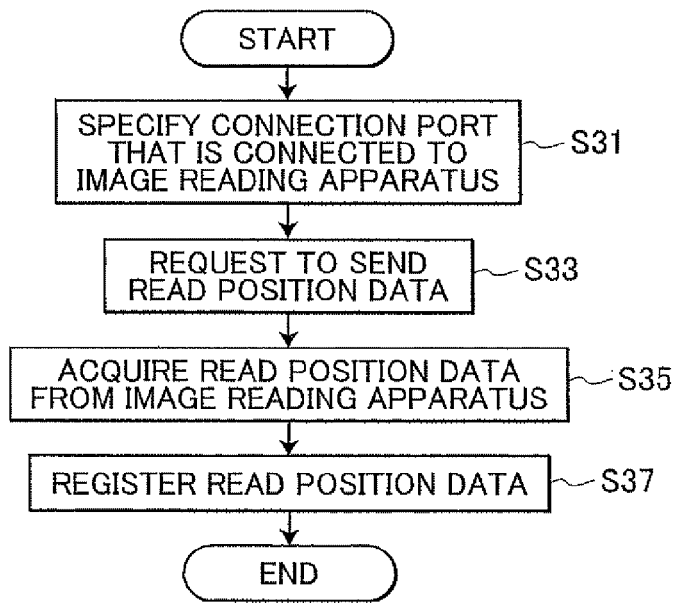
FIG. 11 is a flowchart explaining an operation of an installation program according to a second embodiment.

FIG. 11 is a flowchart explaining an operation of an installation program according to the second embodiment. When the installation program is activated, in S31 the CPU 21 acquires (specifies) the connection port 211 that is connected to the image reading apparatus 10. In S33 the CPU 21 requests to send the read position data to the image reading apparatus 10 through the acquired connection port 211.

The read position data is stored in the storage unit 10D of the image reading apparatus 10 in advance. Thus, the image reading apparatus 10 transmits the read position data stored in the storage unit 10D to the computer 20 upon receiving the request from the computer 20.

Next, in S35 the CPU 21 acquires the read position data that is transmitted from the image reading apparatus 10 as a reply. Then in S37, the read control program is installed on the computer 20. The CPU 21 registers the read position data acquired in S35 by writing the read position data in the position data storage area 241. Subsequently, the CPU 21 ends the installation of the read control program. Here, the transmission and reception of the above described data are realized in accordance with predetermined command.

In the second embodiment, the computer 20 transmits a request to the image reading apparatus 10, and acquires the read position data. The computer 20 can therefore obtain correct read position data of the image reading apparatus 10 that is connected to the computer 20.

Third Embodiment

In the embodiments described above, the computer 20 acquires the read position data for registration when the read control program is installed into the computer 20. In a third embodiment, the computer 20 acquires the read position data when the user inputs an image-reading instruction, as will be explained with reference to FIG. 12.

Here, the expression "when the user instructs the reading of image data" indicates either a time when the read control program is activated (that is, when the display unit 25 displays the setting screen 30) or a time when the user selects the scan start button 32 displayed on the setting screen 30. In the present embodiment, the read position data is acquired when the read control program is activated.

<Control of Acquisition of the Read Position Data According to the Third Embodiment>

Figure 12:
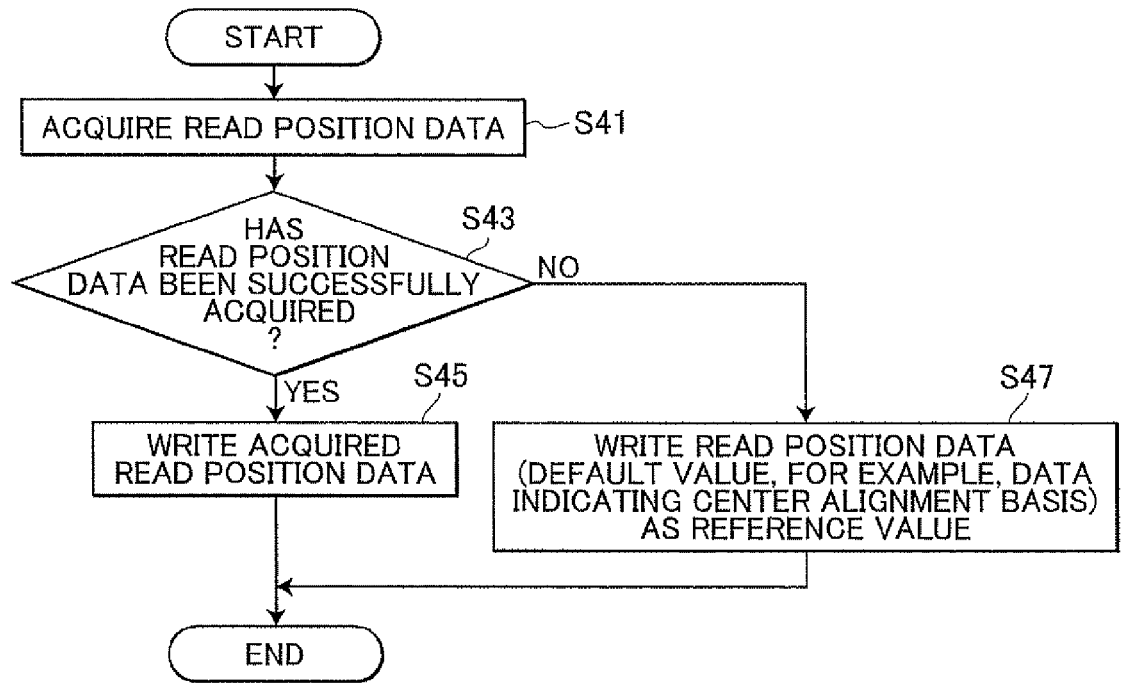
FIG. 12 is a flowchart explaining a process for acquiring she read position data according to a third embodiment.

When the read control program is activated, the display unit 25 displays the setting screen 30. At the same time, the process of FIG. 12 is started. First, in S41 the CPU 21 requests to send the reading position data to the image reading apparatus 10 and acquires the read position data that is transmitted from the image reading apparatus 10 as a reply.

Next, in S43 the CPU 21 determines whether the read position data has been successfully acquired. If the CPU 21 determines that the read position data has been successfully acquired (S43: YES), in S45 the CPU 21 writes the acquired read position data in the position data storage area 241. The CPU 21 ends this process.

If the CPU 21 determines that the read position data has failed to be acquired (543: No), in S47 the CPU 21 writes read position data (default value) that is embedded in the read control program in advance, as a standard value into the position data storage area 241. Subsequently, the CPU 21 ends the process.

Here, the read position data embedded in the read control program, as the standard value (default value) is, for example, data designating that the center-alignment basis method is used both of the FB reading mode and the ADF reading mode.

After the read position data has been written in the position data storage area 241, the coordinates of the reading region by which the reading operation is performed are calculated from the read position data in the same way as in the first embodiment.

<Features of image Reading System and Read Control Program According to the Third Embodiment>

In the third embodiment, the read position data is acquired when the user inputs an instruction to read image. Every time the user inputs the instruction, the CPU 21 acquires the read position data. Thus, the latest read position data is always acquired. Based on the latest read position data the reading region is determined. Accordingly, the reading region is correctly determined even if the specification or features of the image reading apparatus 10 is altered after the read control program has been installed into the computer 20.

Fourth Embodiment

Figures 13, 14:
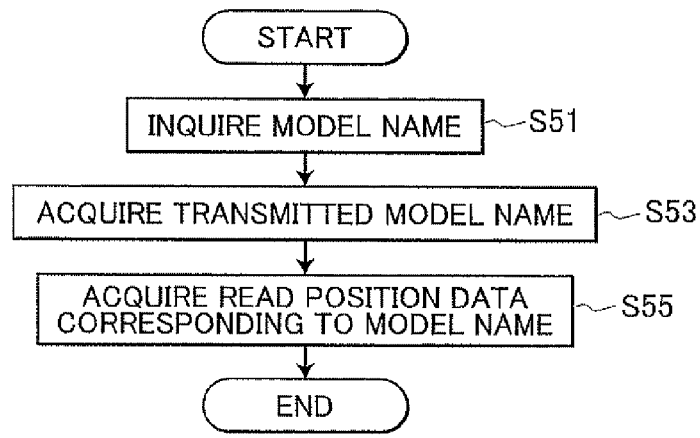
FIG. 13 is a flowchart explaining a control to acquire the read position data according to the fourth embodiment.
FIG. 14 is a table showing correspondence information that correlates the model name with the read position data.

Similar to the third embodiment, a fourth embodiment acquires the read position data when the user inputs an instruction to read image. In the third embodiment, the CPU 21 just acquires the read position data. In the fourth embodiment, the CPU 21 acquires model data (e.g., model name or model number) about the image reading apparatus 10 as shown in FIG. 13 from the image reading apparatus 10. Then, in the fourth embodiment, the CPU 21 identifies the read position data that corresponds to the acquired model data, thus the CPU 21 indirectly obtains the read position data.

In the fourth embodiment, the HDD 24 includes a correspondence storage area 242 (FIG. 1) that is different area from the position data storage area 241. The correspondence storage area 242 is readable by the read control program. The correspondence storage area 242 is for storing correspondence information 120. The CPU 21 stores the correspondence information 120 in the correspondence storage area 242 when the read control program is installed in the computer 20. FIG. 14 is a table showing the correspondence information 120. The correspondence information 120 correlates the model name and the read position data of the FB reading mode and correlates the model name with the read position data of the ADF reading mode.

In the fourth embodiment, the reading apparatus 10 stores data indicating a model name of the reading apparatus 10 in the storage unit 10D.

Similar to the third embodiment, the display unit 25 displays the setting screen 30 when the read control program is activated. At the same time the setting screen 30 is displayed, the control shown in FIG. 12 is started. The control proceeds in the same way as in the third embodiment, except for S41 in which the read position data is acquired.

FIG. 13 is a flowchart explaining a control to acquire the read position data that is performed in step S41 In the step of acquiring the read position data (S41), at first, in S51 the CPU 21 inquires the model name of the image reading apparatus 10 connected to the computer 20. The image reading apparatus 10 transmits the model name stored in the storage unit 10D as a reply. In S53 the CPU 21 acquires the transmitted model name from the image reading apparatus 10.

Next, in S55 the CPU 21 acquires the read position data corresponding to the model name by referring the correspondence information 120. That is, when the document sensor generating a signal indicating the existence of a document, the CPU 21 reads the read position data for the ADF reading mode corresponding to the model name by referring the correspondence information 120. When the document sensor generating a signal indicating the absence of a document, the CPU 21 read position data for the FB reading mode corresponding to the model name by referring the correspondence information 120.

The read position data for each model can therefore be reliably acquired by referring to the relation between the model name and the read position data.

Other Embodiments

While the invention has been described in detail with reference to the above embodiments thereof, it would be apparent to those skilled in the art that various changes and modifications may be made therein without departing from the spirit of the invention.

In the first and second embodiments, the installation program and the read control program are independent from each other. However, the invention is not limited to this. The installation program and the read control program may form one program.

In the first and second embodiments, the read position data is directly acquired. However, the invention is not limited to this. The read position data may be acquired indirectly based on the model data as in the fourth embodiment.

In the third and fourth embodiments, the expression "when the user instructs the reading of image data" indicates the time the read control program is activated. However, the invention is not limited to this. The expression "when the user instructs the reading of image data" may indicate a time when the user selects the scan start button 32.

In the fourth embodiment, the position data is determined from the correspondence information 120 stored in the computer 20 (more precisely, in HDD 24) when the read control program is installed. However, the invention is not limited to this. The correspondence information 120 is embedded in the read control program, in advance. In this case, the position data may be determined by the correspondence information 120 embedded in the read control program. Instead of embedding the correspondence information 120, the read control program may have execution steps that determine a relation between the model type and the read position data. In this case, for example, the read control program has a step to specify the model name of the image reading apparatus. Further, the read control program has another step to specify the read position data corresponding to the specified model name.

In the fourth embodiment, the correspondence information 120 may be stored in the server. In this case, the computer 20 is connected to the server. The computer 20 acquires the correspondence information 120 by accessing the server each time the user instructs to read image. In this case, the correspondence information 120 may not be stored in the HDD 24.

In the embodiments described above, the computer 20 on which the read control program is installed is a unit separated from the image reading apparatus 10. However, the computer 20 on which the read control program is installed may be integrated with the image reading apparatus 10.

In any embodiment described above, the read position data in the ADF reading mode is registered (changed) by the user when the read position data setting control is activated in a state that the document sensor is generating a signal indicating the existence of a document. On the other hand, the read position data in the FB reading mode is registered (changed) by the user when the read position data setting control is activated in a state that the document sensor is generating a signal indicating the non-existence of a document. However, the invention is not limited to this. The user may specify what reading mode of the read position data the user would like to change. For example, in the process of setting a read-position (see FIG. 6), the CPU 21 inquires the user what reading mode of the read position data the user would like to change.

What is claimed is:

1. A method for controlling an image reading apparatus that scans an image from a document, the method comprising:
    (a) acquiring read position data indicating a reference position where the image reading apparatus performs scanning operations;
    (b) acquiring size data indicating a size of the document; and
    (c) calculating and setting automatically a reading region that defines, based on the acquired read position data and the acquired size data, a range that is used when the image reading apparatus scans an image, wherein the acquiring step (a) comprises inquiring the read position data to the image reading apparatus.

2. The method according to claim 1, further comprising (d) storing the read position data,
    wherein the acquiring step (a) acquires the read position data from the stored read position data.

3. The method according to claim 2, further comprising changing read position data that is stored in the storing step (d).

4. The method according to claim 1, further comprising (e) receiving a user's instruction to start scanning an image,
    wherein the acquiring step (a) is executed after the receiving step (e).

5. The method according to claim 1, wherein the image reading apparatus comprises a reading unit, a flatbed document table, and an ADF document table,
    wherein the acquiring step (a) acquires at least one of read position data for a flatbed (FB) reading mode in which the image reading unit reads the image of the document that is located on the flatbed document table at rest and read position data for an ADF reading mode in which the image reading unit reads the image of the document that is automatically fed from the ADF document table to the reading unit.

6. The method according to claim 5, wherein the acquiring step (a) acquires at least one of read position data for a first FB reading mode in which a corner of the document is aligned with a corner of the flatbed document table, read position data for a second FB reading mode in which the corner of the document is aligned with a part of the flatbed document table other than the corner thereof, read position data for a first ADF reading mode in which a corner of a document is aligned with a corner of the ADF document table, and read position data for a second ADF reading mode in which a corner of a document is aligned with a part of the ADF document table other than the corner thereof.

7. The method according to claim 1, wherein when the acquiring step (a) fails to acquire the read position data, the calculating and setting step (c) calculates and sets the reading region by using predetermined read position data as the read position data.

8. A method for controlling an image reading apparatus that scans an image from a document, the method comprising:

(a) acquiring read position data indicating a reference position where the image reading apparatus performs scanning operations;
(b) acquiring size data indicating a size of the document;
(c) calculating and setting automatically a reading region that defines, based on the acquired read position data and the acquired size data, a range that is used when the image reading apparatus scans an image; and (d) acquiring a model type of the image reading apparatus,
wherein the acquiring step (a) acquires the read position data corresponding to the acquired model type.

9. The method according to claim 8, wherein the acquiring step (a) acquires the read position data corresponding to the acquired model type based on correspondence data that comprises a relation between the model type and the read position data.

10. A method for controlling an image reading apparatus that scans an image from a document, the method comprising:
(a) acquiring read position data indicating a reference position where the image reading apparatus performs scanning operations;
(b) acquiring size data indicating a size of the document;
(c) calculating and setting automatically a reading region that defines, based on the acquired read position data and the acquired size data, a range that is used when the image reading apparatus scans an image;
(d) sending an instruction to start reading image to the image reading apparatus when a user performs a prescribed operation; and
(e) selecting a reading mode from a plurality of modes comprising the FB reading mode and the ADF reading mode;
wherein the image reading apparatus comprises a reading unit, a flatbed document table, and an ADF document table,
wherein the acquiring step (a) acquires at least one of read position data for a flatbed (FB) reading mode in which the image reading unit reads the image of the document that is located on the flatbed document table at rest and read position data for an ADF reading mode in which the image reading unit reads the image of the document that is automatically fed from the ADF document table to the reading unit,
wherein the acquiring step (a) acquires the read position data corresponding to the selected reading mode, and
wherein the calculating and setting step (c) sets the reading region corresponding to the selected reading mode.

11. The method according to claim 10, wherein the reading image apparatus further comprises a hand scanner,
wherein the selecting step (e) selects a hand scan reading mode, as the reading mode, in which the hand scanner reads the image of the document,
wherein the calculating and setting step (c) sets the reading region indicating a region that can be used by neither the FB reading mode nor the ADF reading mode.

12. An image reading apparatus comprising:
a scanning unit that is configured to perform scanning operation;
a storing unit that is configured to store read position data indicating a reference position where the image reading apparatus performs scanning operations, said read position data being based upon a model type of the image reading apparatus;
a reading unit that is configured to read the read position data stored in the storing unit;
an acquiring unit that is configured to acquire size data indicating a size of the document; and
a setting unit that is configured to automatically calculate and set a reading region that defines, based on the read position data and the size data, a range that is used when the image reading unit reads the image.

13. The image reading apparatus according to claim 12, wherein when the acquiring unit fails to acquire the read position data, the setting unit calculates and sets the reading region by using predetermined read position data as the read position data.

14. A non-transitory computer-readable storage medium storing a set of program instructions executed by a computer for controlling an image reading apparatus that scans an image from a document, the program instructions comprising:
(a) acquiring read position data indicating a reference position where the image reading apparatus performs scanning operations;
(b) acquiring size data indicating a size of the document;
(c) calculating and setting automatically a reading region that defines, based on the acquired read position data and the acquired size data, a range that is used when the image reading apparatus reads an image; and
(d) acquiring a model type of the image reading apparatus,
wherein the acquiring instruction (a) acquires the read position data corresponding to the acquired model type.

15. The non-transitory computer-readable storage medium according to claim 14, wherein the read position data is registered when the set of program instructions is installed on the computer,
wherein acquiring instruction (a) acquires the read position data from the registered read position data.

16. The non-transitory computer-readable storage medium according to claim 15, wherein the program instructions further comprises (e) changing read position data.

17. The non-transitory computer-readable storage medium according to claim 14, wherein when the acquiring instruction (a) fails to acquire the read position data, the calculating and setting instruction (c) calculates and sets the reading region by using predetermined read position data as the read position data.

* * * * *